May 27, 1930. A. FRANCE 1,759,940
APPARATUS FOR WASHING MINERALS BY MEANS OF LIQUID STREAMS
Filed Dec. 30, 1926
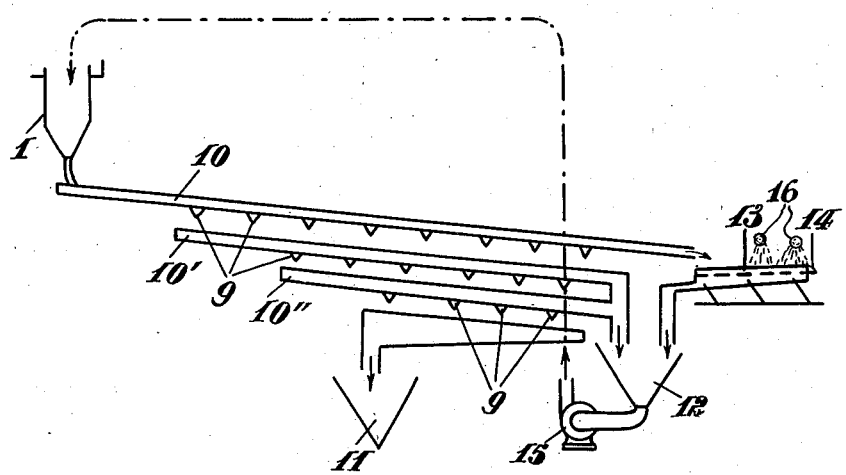
Inventor.
Antoine France
per: [signature]
Attorney.

Patented May 27, 1930

1,759,940

UNITED STATES PATENT OFFICE

ANTOINE FRANCE, OF LIEGE, BELGIUM

APPARATUS FOR WASHING MINERALS BY MEANS OF LIQUID STREAMS

Application filed December 30, 1926, Serial No. 158,063, and in Belgium December 30, 1925.

The present invention relates to improvements in apparatus for washing minerals by means of liquid streams.

The washing of minerals, and more particularly of so-called "schlamms", by means of liquid streams may be effected in plant of the type described in my Patent No. 1,508,176, dated Sept. 9, 1924, and which comprises a number of launders superposed in "cascade" formation, a battery of separating pockets arranged along each of the said launders, and a mechanical device, such as for instance a bucket elevator, which takes up the products delivered at the end of the lowermost launder or launders and returns them to the top of the "cascade". In order that this treatment may be of great efficacy, the said plant must be completed by a concentrating tank to which the raw product and the product taken up by the aforesaid mechanical device are sent both to effect the soaking of the particles and to obtain a suitable degree of concentration. The principle of this arrangement is described in my patent No. 1,476,243 dated Dec. 4, 1923.

In order to increase the efficiency of the washing of the particles in plant of the type just referred to, completed by the concentrating tank, it is desirable to obtain a specific gravity of the muddy liquid which approaches as nearly as possible the ideal specific gravity of separation of the so-called "schist" or slaty material and the clean coal.

Now, in some minerals, such as for instance coal, it often happens that the finest particles are constituted by loam forthcoming in part from the dilution of the schists by the washing operation itself. The object of the present invention is to employ this impalpable loam for the purpose of increasing the specific gravity of the muddy liquid by collecting the washed particles on vibrating screens of very fine mesh (for instance 1/250th of an inch) on which clear water rinsing takes place.

An embodiment of plant suitable for carrying out the process according to the invention, as applied to the washing of so-called "schlamms", is illustrated, by way of example only, by the accompanying drawing.

Referring to the said drawing, 10, 10' and 10" indicate launders arranged in cascade formation and along each of which is arranged a battery of separating pockets 9. The pockets 9 of the lowermost launder 10" deliver pure schist or slaty material, which is collected at 11. The two lowest launders deliver at their end a product to be rewashed, which is received in the tank 12, while the end of the upper launder delivers washed "schlamm" to which there still adheres, however, some loamy mud. According to the invention, this schlamm is delivered on a vibrating screen of very fine mesh 13, on which it is rinsed by means of clear water sprayed from nozzles 16 or similar means, before being finally discharged at 14. The loam-laden water from this rinsing goes to the cistern for the product to be re-washed. As the treatment in the present example applies to fine particles, a centrifugal pump 15 is provided in the present case, rather than a bucket elevator, to bring back this product to be re-washed from the cistern 12 into the concentrating tank 1 which supplies the upper launder 10 with raw product and with product to be re-washed.

The purpose of the operation is double: removing the loam of the washed product of which the particles, owing to the loam diluted in the washing water, are covered with a film of this material, and recovering the said loam which is mixed with the raw material and the material to be re-washed in order to constitute the mixture favourable to the classification according to specific gravity in the washing plant.

It should be understood that while the invention is described above with particular reference to plant comprising a plurality of superposed launders and a concentrating tank supplying the material to be treated to the upper launder, its principle is applicable as well to plant comprising a single washing launder, and to plant wherein the concentrating tank is dispensed with.

It should further be understood that the products to be rewashed may be returned either to the top of the upper launder or to the top of any of the launders of a series of launders superposed in "cascade" formation.

I claim:

A plant for washing schlamms and other fine mineral particles, comprising: a plurality of suitably inclined launders for washing the particles by means of liquid stratifying streams, discharge means for the lowest stratum high gravity particles of each launder except the last into the adjacent launder for further washing therein, a very fine meshed vibrating screen, arranged at the end of the first launder, for separating from the fine particles discharged at the end of same the film of loam surrounding said particles, means for spraying clear water adapted to cooperate with said screen in removing said film of loam, means to collect simultaneously and amalgamate the loam derived from this screening and the light particles discharged at the end of a number of launders, except the first, and means to bring back into one of the launders the thus amalgamated products.

In testimony whereof I signed hereunto my name.

ANTOINE FRANCE.